United States Patent [19]

Brodnax et al.

[11] Patent Number: 5,463,746
[45] Date of Patent: Oct. 31, 1995

[54] DATA PROCESSING SYSTEM HAVING PREDICTION BY USING AN EMBEDDED GUESS BIT OF REMAPPED AND COMPRESSED OPCODES

[75] Inventors: Timothy B. Brodnax, Austin, Tex.; Bryan K. Bullis, Woodbridge; Steven A. King, Herndon, both of Va.; Peter M. Kogge, Endicott, N.Y.; Dale A. Rickard, Manassas, Va.

[73] Assignee: International Business Machines Corp., Armonk, N.Y.

[21] Appl. No.: 968,790

[22] Filed: Oct. 30, 1992

[51] Int. Cl.[6] .................................................. G06F 9/38
[52] U.S. Cl. ...................... 395/375; 364/DIG. 1; 364/263.1; 364/261.7; 364/260.6; 364/260.7
[58] Field of Search ..................................... 395/375, 800

[56] References Cited

U.S. PATENT DOCUMENTS

| | | | |
|---|---|---|---|
| 4,370,711 | 1/1983 | Smith | 395/375 |
| 4,456,955 | 6/1984 | Yanagita et al. | 395/375 |
| 4,477,872 | 10/1984 | Losq et al. | 395/375 |
| 4,760,520 | 7/1988 | Shintani et al. | 395/375 |
| 4,777,592 | 10/1988 | Jones et al. | 395/375 |
| 4,814,976 | 3/1989 | Hansen et al. | 395/375 |
| 4,860,197 | 8/1989 | Langendorf et al. | 395/375 |
| 4,984,154 | 1/1991 | Hanatani et al. | 395/375 |
| 5,146,570 | 9/1992 | Hester et al. | 395/375 |
| 5,268,213 | 11/1993 | Weiser et al. | 395/375 |
| 5,283,873 | 2/1994 | Steely, Jr. et al. | 395/375 |
| 5,287,467 | 2/1994 | Blaner et al. | 395/375 |
| 5,297,281 | 3/1994 | Emma et al. | 395/650 |

OTHER PUBLICATIONS

"Opcode Remap & Compression in Hard-Wired RISC Microprocessor," IBM Technical Disclosure Bulletin, vol. 32 No. 10A, Mar. 1990, N.Y., p. 349.
Lilja; "Reducing The Branch Penalty in Pipelined Processors". IEEE Jul. 1988, pp. 47–55.
Dwyer et al., "A Fast Instruction Dispatch Unit for Multiple and Out–of–Sequence Issuances" EE–CEG–87∝15, pp. 1–10 & FIGS. 1–9.
McFarling et al.; "Reducing the Cost of Branched" IEEE 1986, pp. 396–403.
Sohi et al.; "Instruction Issue Logic for High Performance Interruptable Pipelined Processors"; ACM 1987; pp. 27–34.
"Branch Prediction Strategies and Branch Target Buffer Design," Computer, vol. 17, No. 2, Jan. 1984, pp. 6–21.

*Primary Examiner*—Krisna Lim
*Attorney, Agent, or Firm*—Joseph C. Redmond; Mark Wurm

[57] ABSTRACT

A data processing system includes branch prediction apparatus for storing branch data in a branch prediction RAM after each branch has occurred. The RAM interfaces with branch logic means which tracks whether a branch is in progress and if a branch was guessed. An operational code compression means forms each instruction into a new operation code of lesser bits and embeds a guess bit into the new operational code. Control means decode the compressed operational code as an input to an instruction execution unit whereby conditional branch occurs based on the guess bit provided a branch instruction is not in progress in the system.

9 Claims, 3 Drawing Sheets

| TABLE | OPCODE COMPRESSION DEFINITION (STAGE 2 ROM ADDRESS). THE OPCODE FROM THE I-PORT IS UNCHANGED EXCEPT FOR THE FOLLOWING INSTRUCTIONS BELOW, SHOWN WITH THE MAPPING TO THE NEW OPCODE. IN THIS TABLE THESE SYMBOLS HAVE THE FOLLOWING MEANING: x-DON'T CARE, BIP-BRANCH IN PROCESS, g-GUESS TAKEN (ACTIVE HIGH), rs-GPR ADDRESS LSBs (MSBs IMPLIED 1 IN THESE INSTRUCTIONS). |
|---|---|

| COMMAND | I-PORT OF I-FILE /60 | BIP /64 | GUESS /66 | NEW OPCODE /62 | # OF INSTRS | OPCODES |
|---|---|---|---|---|---|---|
| BASE RELATIVE | 00abcdxx xxxxxxxx | X | X | 00abcd00 | 64 | 16 |
| BRX | 010000xx efphxxxx | X | X | 00efph01 | 64 | 16 |
| IMML | 01001010 xxxjklm | X | X | 00jklm10 | 16 | 16 |
| JUMP | 011100rs xxxxxxxx<br>011101rs xxxxxxxx<br>011110rs xxxxxxxx<br>0111xxxx xxxxxxxx | 0<br>0<br>0<br>1 | g<br>g<br>g<br>X | 01110grs<br>0111100g<br>0111100g<br>11111110 | 15 | 14 |
| BEX | 01110111 xxxxxxxx | X | X | 01111011 | 1 | 1 |

NOTE: BEX TRANSLATION OVERRIDES THE JUMP TRANSLATION.

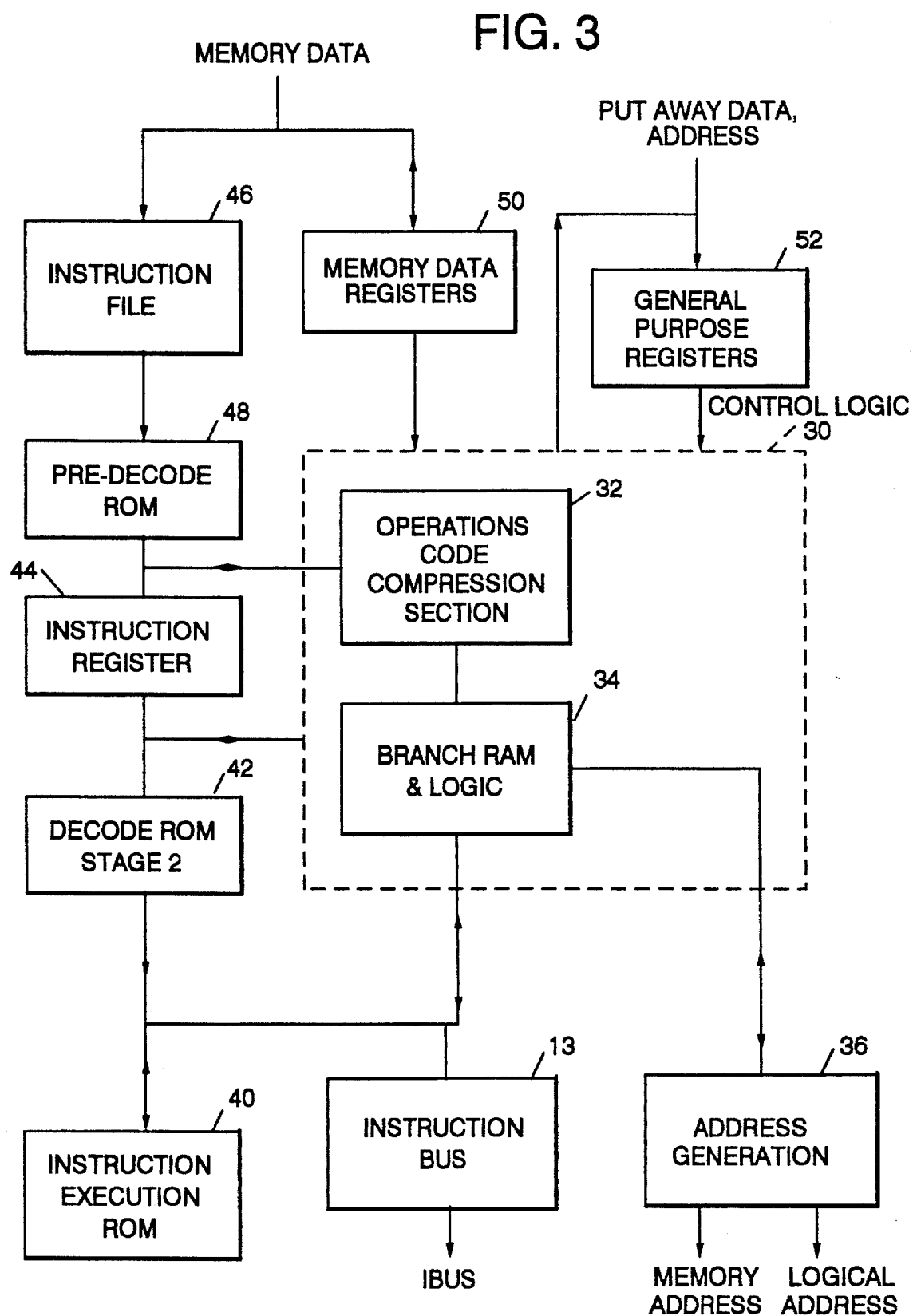

FIG. 4

TABLE  OPCODE COMPRESSION DEFINITION (STAGE 2 ROM ADDRESS). THE OPCODE FROM THE I-PORT IS UNCHANGED EXCEPT FOR THE FOLLOWING INSTRUCTIONS BELOW, SHOWN WITH THE MAPPING TO THE NEW OPCODE. IN THIS TABLE THESE SYMBOLS HAVE THE FOLLOWING MEANING: x-DON'T CARE, BIP-BRANCH IN PROCESS, g-GUESS TAKEN (ACTIVE HIGH), rs-GPR ADDRESS LSBs (MSBs IMPLIED 1 IN THESE INSTRUCTIONS).

| COMMAND | I-PORT OF I-FILE | BIP | GUESS | NEW OPCODE | # OF INSTRS | OPCODES |
|---|---|---|---|---|---|---|
| BASE RELATIVE | 00abcdxx xxxxxxxx | x | x | 00abcd00 | 64 | 16 |
| BRX | 010000xx efphxxxx | x | x | 00efph01 | 64 | 16 |
| IMML | 01001010 xxxxjklm | x | x | 00jklm10 | 16 | 16 |
| JUMP | 011100rs xxxxxxxx<br>011101rs xxxxxxxx<br>011110rs xxxxxxxx<br>0111xxxx xxxxxxxx | 0<br>0<br>0<br>1 | g<br>g<br>g<br>x | 01110grs<br>0111100g<br>0111100g<br>11111110 | 15 | 14 |
| BEX | 01110111 xxxxxxxx | x | x | 01111011 | 1 | 1 |

NOTE: BEX TRANSLATION OVERRIDES THE JUMP TRANSLATION.

1

DATA PROCESSING SYSTEM HAVING PREDICTION BY USING AN EMBEDDED GUESS BIT OF REMAPPED AND COMPRESSED OPCODES

This invention was made with Government support under contract number F29601-87-C-0006, awarded by the Department of the Air Force. The Government has certain rights in this invention.

BACKGROUND OF THE INVENTION

1. Technical Field

The invention disclosed broadly relates to digital computer processing systems and more particularly to pipelined data processing systems including branch prediction.

2. Background Art

Data processing systems generally include a central processor, associated storage systems and peripheral devices and interfaces. Typically the main memory consists of relatively low cost, high capacity, digital storage devices. The peripheral devices may be, for example, nonvolatile, semi-permanent storage media such as magnetic disks and magnetic tape drives. In order to carry out tasks, the central processor of such a system executes a succession of instructions which operate on the data. The succession of instructions and the data those instructions reference are referred to as a program.

In the operation of such systems, programs are initially brought to an intermediate storage area, usually in the main memory. The central processor may then interface directly to the main memory to execute the stored program. However, this procedure places limitations on performance due principally to the relative long times required in accessing that main memory. To overcome these limitations, a high speed storage system, in some cases called a cache is used to hold currently used portions of program within the central processor itself. The cache interfaces with the main memory through memory control hardware which handles program transfers between the central processor main memory and the peripheral device interfaces.

One form of computer has been developed in the prior art to concurrently process a succession of instructions in a so-called pipeline manner. In such pipeline processors, each instruction is executed in part at each of a succession of stages. After the instruction has been processed at each of the stages, the execution is complete. With this configuration, an instruction is passed from one stage to the next. That instruction is replaced by the next instruction in the program. Thus, the stages together form a pipeline which at any given time, is executing in part, a succession of instructions. Such instruction pipelines, processing a plurality of instructions in parallel, are found in several digital computing systems. These processors consist of a single pipeline of varying length and employ hardwired logic for all data manipulation. The large quantity of control logic in such machines is difficult to handle, for example, conditional branch instructions, make them extremely fast, but also very expensive.

The present invention relates to branch prediction mechanisms for handling conditional branch instructions in a computer system. When a branch instruction is encountered, it is wasteful of the computer resource to wait for resolution of the instruction before proceeding with the next programming step. Therefore, it is a known advantage to provide a prediction mechanism to predict in advance the instruction to be taken as a result of a conditional branch. If the prediction is successful, it allows a computer system to function without a delay in processing time. There is a time penalty if the prediction is incorrect. Therefore an object of the present invention is to provide an improved branch prediction mechanism with a high prediction accuracy to minimize the time loss caused by incorrect predictions.

In most pipeline processors, conditional branch instructions are resolved in the execution unit. Hence, there are several cycles of delay between the decoding of a conditional branch instruction and its execution. In an attempt to overcome the potential loss of these cycles, the decoder guesses as to which instructions to decode next. Many pipeline processors classify branches according to an instruction field. When a branch is decoded, the outcome of the branch is predicted, based on its class.

An example of a prior art branch prediction scheme is disclosed in U.S. Pat. No. 4,477,872 to Losq, et al. which patent is assigned to the assignee of the present invention. The method disclosed predicts the outcome of a conditional branch instruction based on the previous performance of the branch, rather than on the instruction fields. The prediction of the outcome of a conditional branch is performed utilizing a table which records a history of the outcome of the branch at a given memory location. The disclosed method predicts only the branch outcomes and not the address targets for prefetching an instruction. The present invention is related to patent application Ser. No. 07/783,060 entitled "Synchronizing a Prediction RAM," assigned to the assignee of the present invention, filed Oct. 25, 1991, its teachings are herein incorporated by reference. Disclosed is a high speed, pipelined CPU which breaks large execution flows into stages to allow a dramatic improvement in the system latency between registers. The multitude of stages allow better observability for testing and debugging of the overall system.

The performance enhancement of the pipeline processor is dependent on the degree to which each stage of the pipeline is kept busy processing its instructions and passing the results onto the next stage. In an ideal environment, each instruction would pass through a new stage every clock cycle. With this assumption, instruction execution time would be equal to the clock cycle time after the start-up latency has filled the pipeline. A serious degradation of pipeline performance improvement can result when branch instructions cause the pipeline to be flushed and restarted with a new instruction stream. It is desirable to know the result of a conditional branch instruction when instructions are being fetched. Unfortunately, this is not always possible, because conditional branches are often dependent on the instruction immediately preceding them in the pipeline.

OBJECTS OF THE INVENTION

It is therefore an object to provide a highly accurate branch prediction.

It is another object of the invention to provide for instruction operation compression within the computer processing unit.

SUMMARY OF THE INVENTION

The present invention employs the least significant eight bits from the memory address used to address a RAM. Assuming repeatability in programming, a decision has been made to guess that the branch will resolve in the same way the previous branch to a given address was decided. This is done by using the memory address to read a RAM which was written with branch data after the branch has been resolved. Rather than the entire memory address, only the lower eight bits are used. This provides a good trade-off between hardware, which dramatically increases the number of bits used to address the prediction RAM and performance of the device.

Along with branch prediction, an operations instruction code has been compressed from a 12-bit to an eight-bit mapping to provide a 160 operations to be derived from 62 operational codes. This reduces the needed ROM space from 512-byte ROM to a 256-byte ROM, which represents significant savings in hardware size and speed.

BRIEF DESCRIPTION OF THE DRAWINGS

These and other objects, features and advantages of the present invention will be more fully appreciated with reference to the accompanying figures.

FIG. 3 is a block diagram of the branch prediction RAM logic.

FIG. 4 is a table showing the operations code compression scheme of the present.

DISCUSSION OF THE PREFERRED EMBODIMENT

Figure 1:
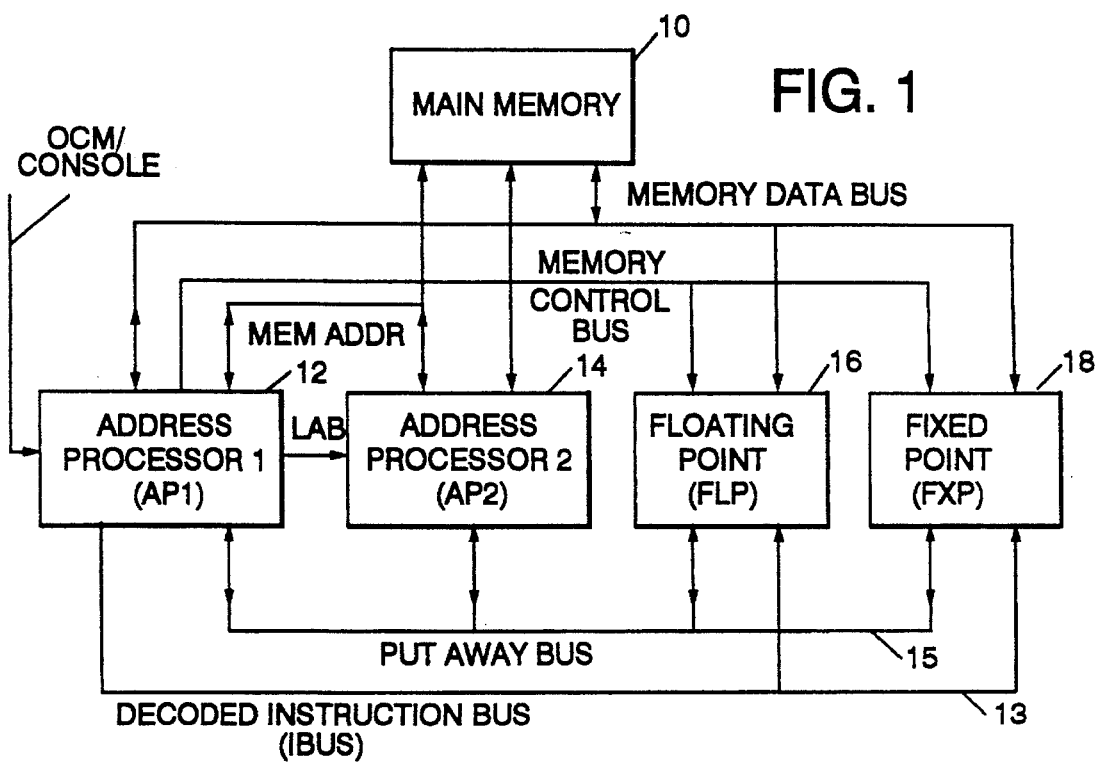
FIG. 1 is a schematic diagram of a typical computer system employing central processing units tied to communication buses.

An example of a typical computer system embodying the present invention is shown in FIG. 1. Address processor 12 reads instructions from the main memory 10 and dispatches commands to execution elements such as fixed point processor 18 and floating point processor 16, or the address translator 14. The address processor 12 sources the instruction bus (I-bus) 13 which issues service requests to the execution elements. Any general purpose petition updating is done across the put-away bus 15.

Assuming repeatability in programming, it was decided to implement the best guess that the conditional branch would be resolved the same way that the previous conditional branch to a given address was decided. This is done by using the memory address to read a RAM that is written with branch data after the branch has been resolved. Rather than the entire memory address, only the lower eight bits are used. This provides a good trade-off between hardware, which increases dramatically with the number of bits used to address the prediction RAM, and performance.

Figure 2:
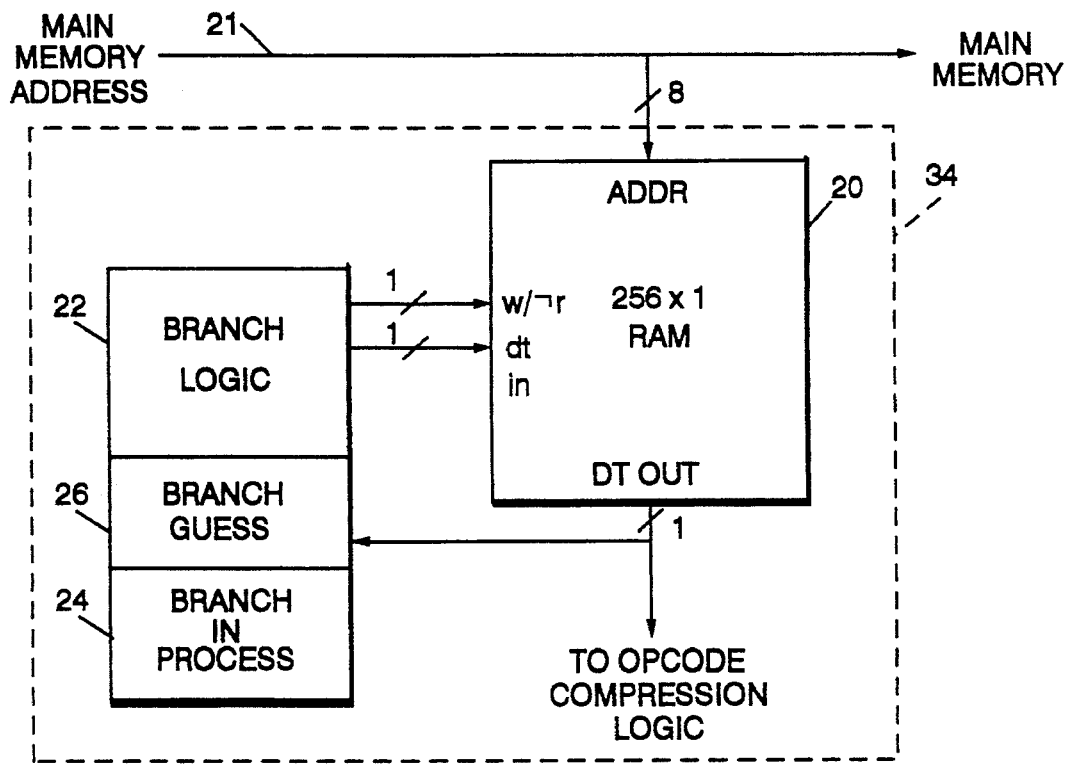
FIG. 2 is a logic diagram showing the implementation of the present invention.

Shown in FIG. 2 is an implementation in detail of the main memory bus 21 from which the least significant eight bits have been input into a prediction controller 20, which is a 256-bit RAM. Controller 20 interfaces with the branch logic 22. A determination of branch in progress (BIP) is made in section 24. If a branch is in progress a guess prediction is made in unit 26. The least significant 8 bits from the memory address are used to address the RAM 20. Branch logic tracks whether a branch was guessed and if a branch is currently in progress. A significant speed and hardware enhancement to the implementation of this branch prediction is the inclusion of the guess in the formation of the operations code.

Shown in FIG. 3 is a block diagram of the address processor of the present invention. Control logic 30 contains an operations code compression section 32 and a branch RAM logic 34. Address generators 36 output and receive memory and logical addresses to the computer system. Instruction bus 13 is connected to the branch RAM and logic unit 34. Instruction execution ROM 40 interfaces with the instruction bus and decodes the instructions in decode ROM 42. Instruction register 44 receives as an input memory data through precode RAM 48 from instruction file 46. The memory data in register 50 interfaces with the memory data in the logic control chip 30. Put-away bus 15 handles data and addresses at general purpose register 52 shown interfacing with the control logic 30.

The microcode for a given instruction is executed by first passing the instruction code through a pre-decode RAM 48 which produces the first microword for all instructions. Further microwords for given instructions are produced in the instruction microcode ROM 42. The use of microcodes is a characteristic of a Complex Instruction Set Computer (CISC) architecture. It allows a variety of instructions to be decoded with a minimal amount of hardware. While not as fast as hardwired solutions, the microcode ROMs have a relatively quick decode time. Imbedding the guess bit of branch prediction in the microcode address (the compressed operation code) for jump operations to be decoded leads to a fast/simple decode, including the target address consistent with the guess.

The operational code 60 is manipulated for the instructions in the opcode compression unit 32. This compressed opcode allows the guess bits to be imbedded into the opcode (decode address) without requiring a larger ROM. The decode ROM allows quick target address generation and thus, execution within the cycle time. The resulting opcode compression 62 and branch instructions 64 are shown in the table of FIG. 4. The 12-bit opcodes for the extended instructions are reduced to eight bits before entering the I register 44 which addresses the decode ROM 42. It is to be noted that for the instructions shown, 160 operations are compressed to 62 operation codes. This technique, along with the compression of input/output operations, allows 384 required instructions to be decoded from a 256-byte ROM. Avoiding the use of a 512-byte ROM, which would have been needed without compression. This represents a significant saving in hardware size and speed.

It can be seen that the guess bit 66 is only relevant to conditional branches and that a guess would only effect the operation code of a conditional branch if the CPU is not processing a previous branch, as indicated by the branch in progress unit 24. The branch logic 22 combines operation code, a prediction signal and a signal which indicates another branch is in progress.

The branch prediction algorithm disclosed has achieved an accuracy of approximately 85 percent of the instruction sets tested. This is led to an overall performance improvement of approximately seven percent. The additional hardware is easily justified by this performance improvement. The hardware was limited to 256-bit RAM, guess logic and operations code compression logic. The guess logic and the compressed opcode, are done in microcode. This allows the task to be handled with good performance in a minimum of space.

Although a specific embodiment of the present invention has been disclosed, it will be understood by those of skill in the art that the foregoing and changes in form and detail can be made therein without departing from the spirit and scope of the invention.

What is claimed is:

1. A computing machine including a main memory and employing conditional branch prediction comprising:

a prediction random access memory coupled to the main memory for receiving a selected number of least significant bits of a previously written memory address;

branch prediction logic for determining if a branch guess is in progress; generating a guess bit, if a branch is in progress, and producing a prediction based on the previously written memory address;

operational code compression means for re-mapping all processor execution instruction files into compressed operational codes and embedding the guess bit into the compressed operational codes of lesser size than original operational codes included in the instruction files; and control logic means for interfacing between the main memory and an instruction execution read-only-memory to fetch execution instruction files from main memory, decode the instruction based on the compressed operational code including the embedded guess bit, and predict a conditional branch based on the previous written memory address and the guess bit wherein the read-only-memory is reduced in size due to the compressed operational codes including the embedded guess bit and the computing machine is improved in performance.

2. The computing machine of claim 1 wherein the branch prediction RAM is written with branch data after each time a branch has been resolved.

3. The computing machine of claim 2 wherein the operational code compression means is coupled between the branch prediction RAM and an instruction register.

4. In a data processing system, a memory, a processor, an instruction execution unit and a branch prediction mechanism for handling conditional branch instructions comprising:

a) a branch prediction RAM coupled to the memory, the branch prediction RAM receiving a selected number of least significant digits of a previously written address from the memory as an address in the RAM;

b) branch logic coupled to the branch prediction RAM for (a) determining if a branch instruction is in progress in the instruction unit, and (b) providing a guess bit if a branch is in progress;

c) an operational code compression means coupled to the memory for mapping each operation code to form a new operation code of a lesser number of bits and embedding the guess bit in each new operation code; and d) control means interfacing between the memory and the instruction execution unit for decoding the compressed operational code and predicting a conditional branch based upon the guess bit provided a branch instruction is not in progress.

5. The data processing system of claim 3 further including a precode RAM coupled to the processor instruction files; the precode RAM generating a microcode word as an input to an instruction register, and a decode ROM coupled to the instruction register for generating further microcode words related to the microcode word, the further microcode words provided as successive inputs to the instruction execution unit.

6. The system of claim 5 wherein each operation instruction code in the system is a 12-bit word and each compressed operation code is an 8-bit word whereby the number of system instruction operations are reduced from 160 to 62 through the use of a decode ROM of lesser size than a predecode RAM.

7. A method of branch prediction in a data processing system including a memory, an instruction execution unit, and control means interfacing the memory and the instruction execution unit comprising the steps of:

a. generating a branch prediction signal in a branch prediction RAM using a selected number of least significant digits of a previously written address from the memory as an address for the RAM;

b. determining if a branch is in progress in the instruction execution unit and generating a guess bit if a branch is in progress in a branch prediction logic means;

c. combining the branch prediction signal and guess bit in the branch prediction logic;

d. compressing all processor instruction files in an operation code compression means to form new operation codes of a lesser number of bits and embedding the guess bit in the new operational codes; and e. decoding the new operational code and predicting a conditional branch as an input to the instruction execution unit based on the guess bit.

8. The method of claim 7 further comprising the step of forming each processor execution file as a microcode word and embedding the guess bit into the word for execution provided a branch is not in progress in the system.

9. The method of claim 8 further including the step of decoding the microcode word and guess bit in a decode instruction ROM within a cycle time of the system.

* * * * *